United States Patent
Jin et al.

(10) Patent No.: US 9,401,107 B2
(45) Date of Patent: Jul. 26, 2016

(54) IMAGE DATA PROCESSING METHOD AND DEVICE THEREOF

(71) Applicant: SHENZHEN CHINA STAR OPTOELECTRONICS TECHNOLOGY CO., LTD., Shenzhen (CN)

(72) Inventors: Yufeng Jin, Shenzhen (CN); Hao Li, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/418,697

(22) PCT Filed: Jan. 12, 2015

(86) PCT No.: PCT/CN2015/070497
§ 371 (c)(1),
(2) Date: Jan. 30, 2015

(65) Prior Publication Data
US 2016/0189589 A1 Jun. 30, 2016

(30) Foreign Application Priority Data
Dec. 31, 2014 (CN) .......................... 2014 1 0851696

(51) Int. Cl.
G09G 3/20 (2006.01)
H04N 9/12 (2006.01)
G09G 5/10 (2006.01)

(52) U.S. Cl.
CPC ............... *G09G 3/2003* (2013.01); *G09G 5/10* (2013.01); *H04N 9/12* (2013.01); *G06T 2207/10024* (2013.01); *G09G 2300/0443* (2013.01);
(Continued)

(58) Field of Classification Search
CPC ............... G09G 3/2003; G09G 5/10; G09G 2300/0452; G09G 2320/0233; G09G 2300/0443; H04N 9/12; G06T 2207/10024
See application file for complete search history.

(56) References Cited

U.S. PATENT DOCUMENTS

| 2005/0225563 A1* | 10/2005 | Brown Elliott | .......... | G09G 5/02 345/604 |
| 2009/0046307 A1 | 2/2009 | Kwak et al. | | |
| 2009/0102855 A1* | 4/2009 | Brown Elliott | .......... | G09G 5/02 345/589 |

(Continued)

FOREIGN PATENT DOCUMENTS

| CN | 101370148 A | 2/2009 |
| CN | 102034446 A | 4/2011 |

(Continued)

OTHER PUBLICATIONS

Office Action issued in corresponding Chinese Application No. 201410851696.9 dated Jan. 26, 2016 (8 pages).

*Primary Examiner* — Andrew Sasinowski
(74) *Attorney, Agent, or Firm* — Osha Liang LLP

(57) ABSTRACT

An image data processing method and a device thereof are disclosed, and the method includes: receiving and executing a gamma correction process for first red, green and blue sub-pixel image data to obtain second red, green and blue sub-pixel image data; generating a first white sub-pixel image data, and third red, green and blue sub-pixel image data according to the second red, green and blue sub-pixel image data; and obtaining fourth red, green and blue sub-pixel image data and a second white sub-pixel image data through an inverse gamma conversion process.

20 Claims, 4 Drawing Sheets

(52) U.S. Cl.
CPC ............... *G09G2300/0452* (2013.01); *G09G 2320/0233* (2013.01)

(56) References Cited

U.S. PATENT DOCUMENTS

| | | | |
|---|---|---|---|
| 2009/0174638 A1* | 7/2009 | Brown Elliott | G02F 1/133621 345/88 |
| 2009/0315921 A1* | 12/2009 | Sakaigawa | G09G 3/2003 345/694 |
| 2010/0026722 A1* | 2/2010 | Kondo | G09G 3/2007 345/660 |
| 2011/0084990 A1 | 4/2011 | An et al. | |
| 2014/0022271 A1 | 1/2014 | Lin et al. | |
| 2014/0348423 A1* | 11/2014 | Ishiga | G06F 17/3025 382/165 |
| 2015/0109356 A1* | 4/2015 | Yata | G09G 3/2003 345/691 |
| 2016/0042698 A1 | 2/2016 | Yang et al. | |

FOREIGN PATENT DOCUMENTS

| | | |
|---|---|---|
| CN | 102800297 A | 11/2012 |
| CN | 103700336 A | 4/2014 |
| CN | 104410849 A | 3/2015 |

* cited by examiner

IMAGE DATA PROCESSING METHOD AND DEVICE THEREOF

FIELD OF THE INVENTION

The present invention relates to a technical field of image data processing, and more particularly to an image data processing method and device thereof.

BACKGROUND OF THE INVENTION

A traditional display device generally needs a corresponding image data processing process before displaying images. The image data generally includes R (Red), G (Green), and B (Blue) data. The image data is processed so as to display the image on a display device.

Traditional image data processing techniques generally include the following two schemes:

First, Ri (Red input), Gi (Green input), and Bi (Blue input) are set as the original data and Ro (Red output), Go (Green output), and Bo (Blue output) are the processed data, then:

$$Ro=Ri-Wo;$$

$$Go=Gi-Wo;$$

$$Bo=Bi-Wo;$$

Wo=min[Ri, Gi, Bi], where Wo represents white output data, and min[Ri, Gi, Bi] represents the minimum value among the Ri, Gi, and Bi. In the following description, min [Ri, Gi, Bi] is referred to as min.

Second, Ri, Gi, and Bi are set as the original data and Ro, Go, Bo are the processed data;

$$Ro=Ri*S-Wo;$$

$$Go=Gi*S-Wo;$$

$$Bo=Bi*S-Wo,$$

wherein S=1+min/(max−min) when min/max<½, or S=2, when min/max>½;

Wo=min[Ri, Gi, Bi], wherein the max is max[Ri, Gi, Bi]. The max[Ri, Gi, Bi] equals the largest value among the Ri, Gi, and Bi.

The above described first technical solution separates the W (White) component, which is synthesized by the original RGB components. The technical solution cannot improve the transmittance by fully using the W component adequately.

The above described second technical solution increases the original RGB components, and then separates the W component. The technical solution is able to improve the brightness of the display panel. However, evaluating the value of Wo is limited by the way in which the brightness is maximized, as a result, the values of Ro, Go, and Bo cannot vary smoothly with the grayscales, as illustrated in FIG. 1.

Therefore, it is necessary to provide a new technical solution to solve the above described problems.

SUMMARY OF THE INVENTION

An object of the present invention is to provide an image data processing method and device thereof which can be implemented to convert RGB image data to RGBW image data.

To solve the above described problem, the technical solution of the present invention is as follows:

An image data processing method, the method comprises the following steps: (A) receiving a first red sub-pixel image data, a first green sub-pixel image data, and a first blue sub-pixel image data; (B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data; (C) generating a first white sub-pixel image data according to the second red sub-pixel image data, the second green sub-pixel image data, and the second blue sub-pixel image data; (D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and (E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data; the step (C) comprises the following steps: (c1) executing a color space conversion for the second red sub-pixel image data, the second green sub-pixel image data and the second blue sub-pixel image data to obtain an angle data, a saturation data, and a brightness data, wherein the angle data, the saturation data, and the brightness data are related to the color space, a color space mode corresponding to the color space is a Munsell hue saturation brightness model; and (c2) calculating the first white sub-pixel image date according to the saturation data and the brightness data; the step (c2) comprises: (c21) analyzing the brightness and the saturation to obtain an analysis result, and calculating the first white sub-pixel image data according to the analysis result; a value corresponding to the saturation=1−3/[(Ri+Gi+Bi)*min(Ri, Gi, Bi)], the min(Ri, Gi, Bi) is equal to a minimum value of the Ri, the Gi, and the Bi; the value corresponding to the first white sub-pixel image data=the value corresponding to the brightness data*(1−the value corresponding to the saturation data); the value corresponding to the second red sub-pixel image data is Ri, the value corresponding to the second green sub-pixel image data is Gi, and the value corresponding to the second blue sub-pixel image data is Bi.

In the above described image data processing method, the step (D) comprises steps of: (d1) calculating a gain value according to the saturation data; and (d2) calculating a third red sub-pixel image data, a third green sub-pixel image data and a third blue sub-pixel image data according to the second red sub-pixel image data, the second green sub-pixel image data, the second blue sub-pixel image data, the first white sub-pixel image data, and the gain value.

In the above described image data processing method, the step (d1) comprises a step of: (d11) calculating the gain value according to the following formula: the gain value=2−the value corresponding to the saturation data; the maximum value of the value corresponding to the brightness data is less than or equal to a brightness threshold; and (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

In the above described image data processing method, the step (d2) comprises a step of: (d21) calculating the third red sub-pixel image data, the third green sub-pixel image data, and the third blue sub-pixel image data according to the following formula: the value corresponding to the third red sub-pixel image data=the value corresponding to the second red sub-pixel image data*the gain value−the value corresponding to the first white sub-pixel image data; the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

An image data processing method, the method comprises the following steps: (A) receiving a first red sub-pixel image data, a first green sub-pixel image data, and a first blue sub-pixel image data; (B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data; (C) generating a first white sub-pixel image data according to the second red sub-pixel image data, the second green sub-pixel image data, and the second blue sub-pixel image data; (D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and (E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

In the above described image data processing method, the step (C) comprises steps of: (c1) executing a color space conversion for the second red sub-pixel image data, the second green sub-pixel image data and the second blue sub-pixel image data to obtain an angle data, a saturation data, and a brightness data, wherein the angle data, the saturation data, and the brightness data are related to the color space; and (c2) calculating the first white sub-pixel image date according to the saturation data and the brightness data.

In the above described image data processing method, a color space mode corresponding to the color space is a Munsell hue saturation brightness model.

In the above described image data processing method, the step (c2) comprises a step of: (c21) analyzing the brightness and the saturation to obtain an analysis result, and calculating the first white sub-pixel image data according to the analysis result; a value corresponding to the saturation=1−3/[(Ri+Gi+Bi)*min(Ri, Gi, Bi)], the min(Ri, Gi, Bi) is equal to a minimum value of the Ri, the Gi, and the Bi; the value corresponding to the first white sub-pixel image data=the value corresponding to the brightness data*(1−the value corresponding to the saturation data); and the value corresponding to the second red sub-pixel image data is Ri, the value corresponding to the second green sub-pixel image data is Gi, and the value corresponding to the second blue sub-pixel image data is Bi.

In the above described image data processing method, the step (D) comprises steps of: (d1) calculating a gain value according to the saturation data; and (d2) calculating a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

In the above described image data processing method, the step (d1) comprises a step of: (d11) calculating the gain value according to the following formula: the gain value=2−the value corresponding to the saturation data; the maximum value of the value corresponding to the brightness data is less than or equal to a brightness threshold; and (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

In the above described image data processing method, the step (d1) comprises a step of: (d12) calculating the gain value according to the following formula: the gain value=f(1−S), wherein the maximum value of the value corresponding to the brightness data is greater than a preset brightness threshold; the f(1−S) is a function which has a variable (1−S), the f(1−S) is used to avoid overflow and smooth increment of the Ro, Go, and Bo; and the value corresponding to the third red sub-pixel image data is Ro, the value corresponding to the third green sub-pixel image data is Go, and the value corresponding to the third blue sub-pixel image data is Bo.

In the above described image data processing method, the step (d2) comprises a step of: (d21) calculating the third red sub-pixel image data, the third green sub-pixel image data, and the third blue sub-pixel image data according to the following formula: the value corresponding to the third red sub-pixel image data=the value corresponding to the second red sub-pixel image data*the gain value−the value corresponding to the first white sub-pixel image data; the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

An image data processing device is provided, the device comprises: a receiving module receiving a first red sub-pixel image data, a first green sub-pixel image data, and a first blue sub-pixel image data; a gamma correction processing module executing a gamma correction process for the first red sub-pixel image data, the first green sub-pixel image data, and the first blue sub-pixel image data to obtain a second red sub-pixel image data, a second green sub-pixel image data, and a second blue sub-pixel image data; a first image data generating module generating a first white sub-pixel image data according to the second red sub-pixel image data, the second green sub-pixel image data, and the second blue sub-pixel image data; a second image data generating module generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and an inverse gamma conversion processing module executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

In the above described image data processing device, the first image data generating module comprises: a color space conversion module executing a color space conversion for the second red sub-pixel image data, the second green sub-pixel image data, and the second blue sub-pixel image data to obtain an angle data, a saturation data, and a brightness data, wherein the angle data, the saturation data, and the brightness data are related to the color space; and a first calculating module calculating the first white sub-pixel image date according to the saturation data and the brightness data.

In the above described image data processing device, a color space mode corresponding to the color space is a Munsell hue saturation brightness model.

In the above described image data processing device, the first calculating module analyzes the brightness and the saturation to obtain a analysis result, and calculates the first white sub-pixel image data according to the analysis result; a value corresponding to the saturation=1−3/[(Ri+Gi+Bi)*min(Ri, Gi, Bi)], the min(Ri, Gi, Bi) is equal to a minimum value of the Ri, the Gi, and the Bi; the value corresponding to the first white sub-pixel image data=the value corresponding to the brightness data*(1−the value corresponding to the saturation data); and the value corresponding to the second red sub-pixel image data is Ri, the value corresponding to the second green sub-pixel image data is Gi, and the value corresponding to the second blue sub-pixel image data is Bi.

In the above described image data processing device, the second image data generating module comprises: a second calculating module calculating a gain value according to the saturation data and calculating a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

In the above described image data processing device, the first calculating module further calculates the gain value according to the following formula: the gain value=2−the value corresponding to the saturation data; the maximum value of the value corresponding to the brightness data is less than or equal to a brightness threshold; and (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

In the above described image data processing device, the first calculating module further calculates the gain value according to the following formula: the gain value=f(1−S), wherein the maximum value of the value corresponding to the brightness data is greater than a preset brightness threshold; the f(1−S) is a function which has a variable (1−S), the f(1−S) is used to avoid overflow and smooth increment of the Ro, Go, and Bo; and the value corresponding to the third red sub-pixel image data is Ro, the value corresponding to the third green sub-pixel image data is Go, and the value corresponding to the third blue sub-pixel image data is Bo.

In the above described image data processing device, the second calculating module further calculates the third red sub-pixel image data, the third green sub-pixel image data, and the third blue sub-pixel image data according to the following formula: the value corresponding to the third red sub-pixel image data=the value corresponding to the second red sub-pixel image data*the gain value−the value corresponding to the first white sub-pixel image data; the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

With respect to the prior art, the present invention is implemented to convert RGB image data to RGBW image data, thereby increasing the display brightness of a display panel. In the present invention, the display panel saves more power when it displays an image with equivalent brightness, or the display panel achieves a higher brightness while consuming an equivalent electrical power.

To allow the above description of the present invention to be more clear and comprehensive, there are preferred embodiments with the accompanying figures described in detail below.

DETAILED DESCRIPTION OF THE PREFERRED EMBODIMENTS

The word "embodiment" used in this specification means examples, demonstrations, or illustrations. In addition, the word "a" used in this specification and the corresponding claims can be explained as "one or more", unless it is designated or clearly guided to a singular form.

Figure 1:
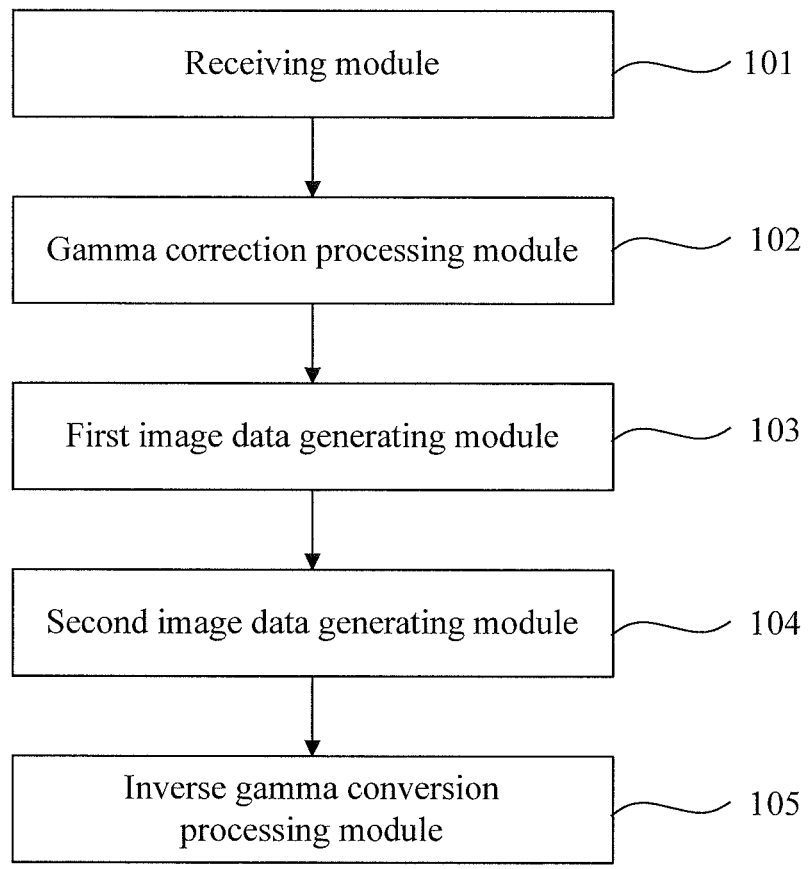
FIG. 1 is a block diagram of an image data processing device according to the first embodiment of the present invention.

Refer to FIG. 1, which is a block diagram of an image data processing device according to the first embodiment of the present invention. The image data processing device is adapted for a display panel, and the display panel can be a thin film transistor liquid crystal display (TFT-LCD), an organic light emitting diode (OLED), etc.

The image data processing device of the first embodiment includes a receiving module 101, a gamma correction processing module 102, a first image data generating module 103, a second image data generating module 104, and an inverse gamma conversion processing module 105.

The receiving module 101 is used to receive a first red sub-pixel image data, a first green sub-pixel image data, and a first blue sub-pixel image data. A (grayscale) value corresponding to the first red sub-pixel image data is referred to as R1, a (grayscale) value corresponding to the first green sub-pixel image data is referred to as G1, and a (grayscale) value corresponding to the first blue sub-pixel image data is referred to as B1.

The gamma correction processing module 102 is used to execute a gamma correction process/normalization process for the first red sub-pixel image data, the first green sub-pixel image data, and the first blue sub-pixel image data to obtain a second red sub-pixel image data, a second green sub-pixel image data, and a second blue sub-pixel image data. A (grayscale) value corresponding to the second red sub-pixel image data is referred to as Ri, a (grayscale) value corresponding to the second green sub-pixel image data is referred to as Gi, and a (grayscale) value corresponding to the second blue sub-pixel image data is referred to as Bi.

The first image data generating module 103 is used to generate a first white sub-pixel image data according to the second red sub-pixel image data, the second green sub-pixel image data, and the second blue sub-pixel image data. A (grayscale) value corresponding to the first white sub-pixel image data is referred to as Wo.

The second image data generating module 104 is used to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data. A (grayscale) value corresponding to the third red sub-pixel image data is referred to as Ro, a (grayscale) value corresponding to the third green sub-pixel image data is referred to as Go, and a (grayscale) value corresponding to the third blue sub-pixel image data is referred to as Bo.

The inverse gamma conversion processing module 105 is used to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data. The fourth red sub-pixel image data, the fourth green sub-pixel image data, the fourth blue sub-pixel image data, and the second white sub-pixel image data are corresponding to the processed (greyscale) values R, G, B, and W respectively.

The above technical solution is implemented to convert RGB image data to RGBW image data. Since the RGBW image data has the W (white) component, the display brightness of a display panel is thereby increased. In the present invention, the display panel saves more power when it displays an image with equivalent brightness, or the display panel achieves a higher brightness while consuming an equivalent electrical power.

Figure 2:
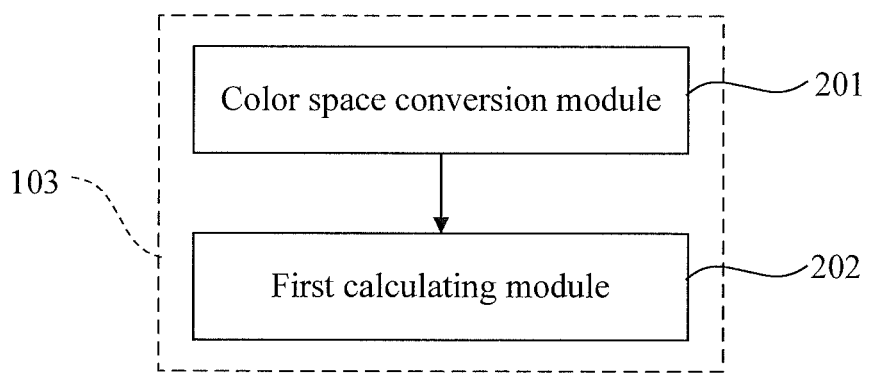
FIG. 2 is a block diagram of a first image data generating module of an image data processing device according to the second embodiment of the present invention.

The image data processing device of the second embodiment of the present invention is similar to the above first embodiment, and the difference is as follows:

The first image data generating module 103 comprises a color space conversion module 201 and a first calculating module 202, as illustrated in FIG. 2.

Figure 3:
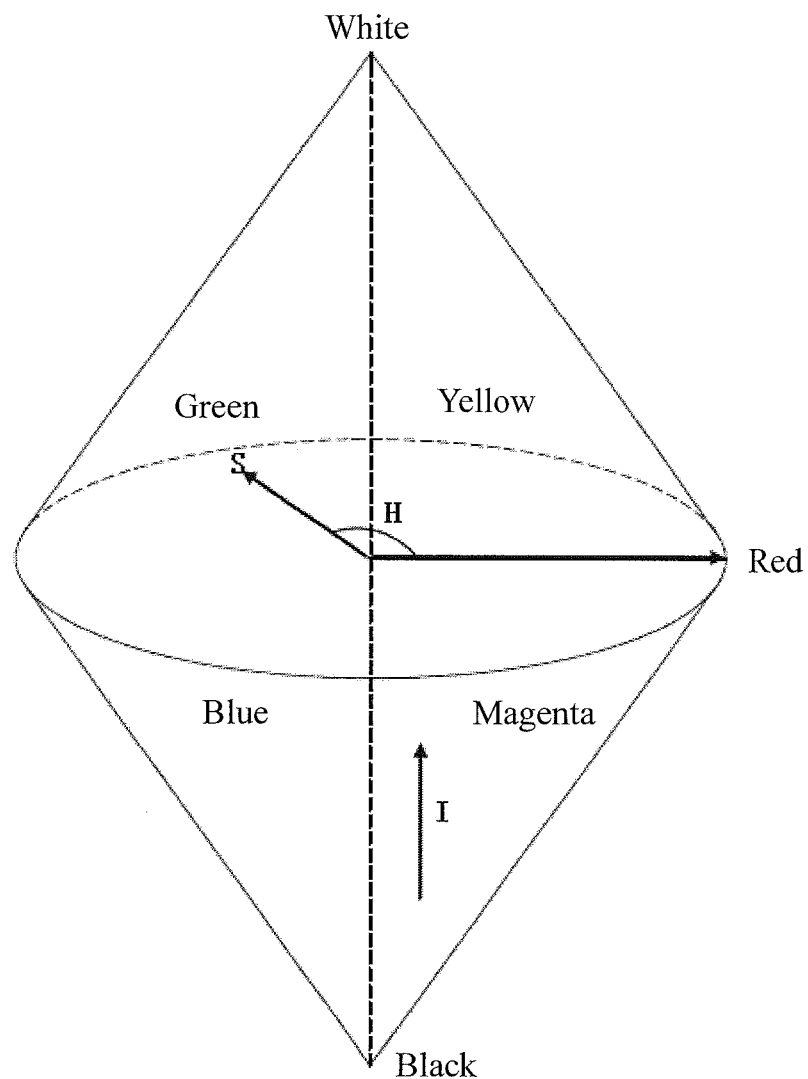
FIG. 3 is a schematic diagram of a space color model of the present invention.
Figure 4:
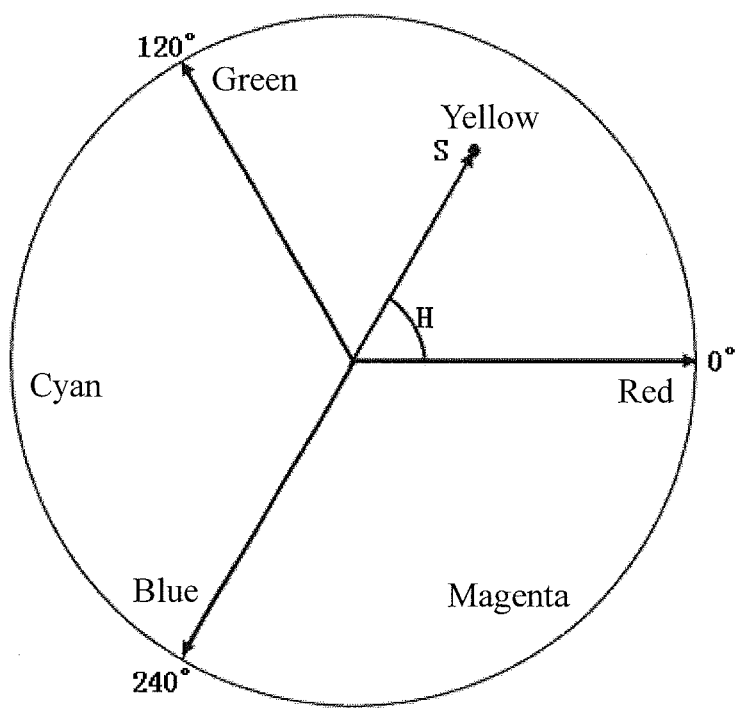
FIG. 4 is a schematic diagram of a hue angle coordinate of the present invention.

The color space conversion module 201 is used to execute a color space conversion for the second red sub-pixel image data, the second green sub-pixel image data, and the second blue sub-pixel image data to obtain an angle data, a saturation data, and a brightness data, and wherein the angle data, the saturation data, and the brightness data are related to the color space. The color space mode corresponding to the color space (Munsell H(Hue), S(Saturation), and I(Intensity) model) is illustrated in FIG. 3. Accordingly, a hue angle coordinate corresponding to the color space is illustrated in FIG. 4.

The first calculating module 202 is used to calculate the first white sub-pixel image date according to the saturation data and the brightness data. Specifically, the first calculating module 202 is used to analyze the brightness (intensity) and the saturation to obtain an analysis result, and calculate the first white sub-pixel image data according to the analysis result.

A value corresponding to the saturation=1−3/[(Ri+Gi+Bi)*min(Ri, Gi, Bi)], and the min(Ri, Gi, Bi) is equal to a minimum value of the Ri, the Gi, and the Bi.

The value corresponding to the first white sub-pixel image data=the value corresponding to the brightness data*(1−the value corresponding to the saturation data).

The second image data generating module 104 comprises a second calculating module.

The second calculating module is used to calculate a gain value according to the saturation data and calculate a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

If the hue of the converted RGBW image data and the hue of the original RGB image data are unchanged, namely, (the value corresponding to the third red sub-pixel image data+the value corresponding to the first white sub-pixel image data): (the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data, namely, (Ro+Wo):(Go+Wo):(Bo+Wo)=Ri:Gi:Bi, then the first calculating module 202 is further used to calculate the gain value according to the following formula:

The gain value=2−the value corresponding to the saturation data, and the maximum value of the value corresponding to the brightness data is less than or equal to a brightness threshold.

The gain value=f(1−S), wherein the maximum value of the value corresponding to the brightness data is greater than a preset brightness threshold.

The f(1−S) is a function which has a variable (1−S), the f(1−S) is used to restrain and smooth the gain so as to avoid overflow and smooth increment of the Ro, Go, and Bo, namely, avoiding the ratio (Ro+Wo):(Go+Wo):(Bo+Wo)=Ri:Gi:Bi being destroyed.

The second calculating module is further used to calculate the third red sub-pixel image data, the third green sub-pixel image data, and the third blue sub-pixel image data according to the following formula:

the value corresponding to the third red sub-pixel image data=the value corresponding to the second red sub-pixel image data*the gain value−the value corresponding to the first white sub-pixel image data;

the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

Through the above technical solution, each component of the outputted RGBW image data is kept smooth.

Figure 5:
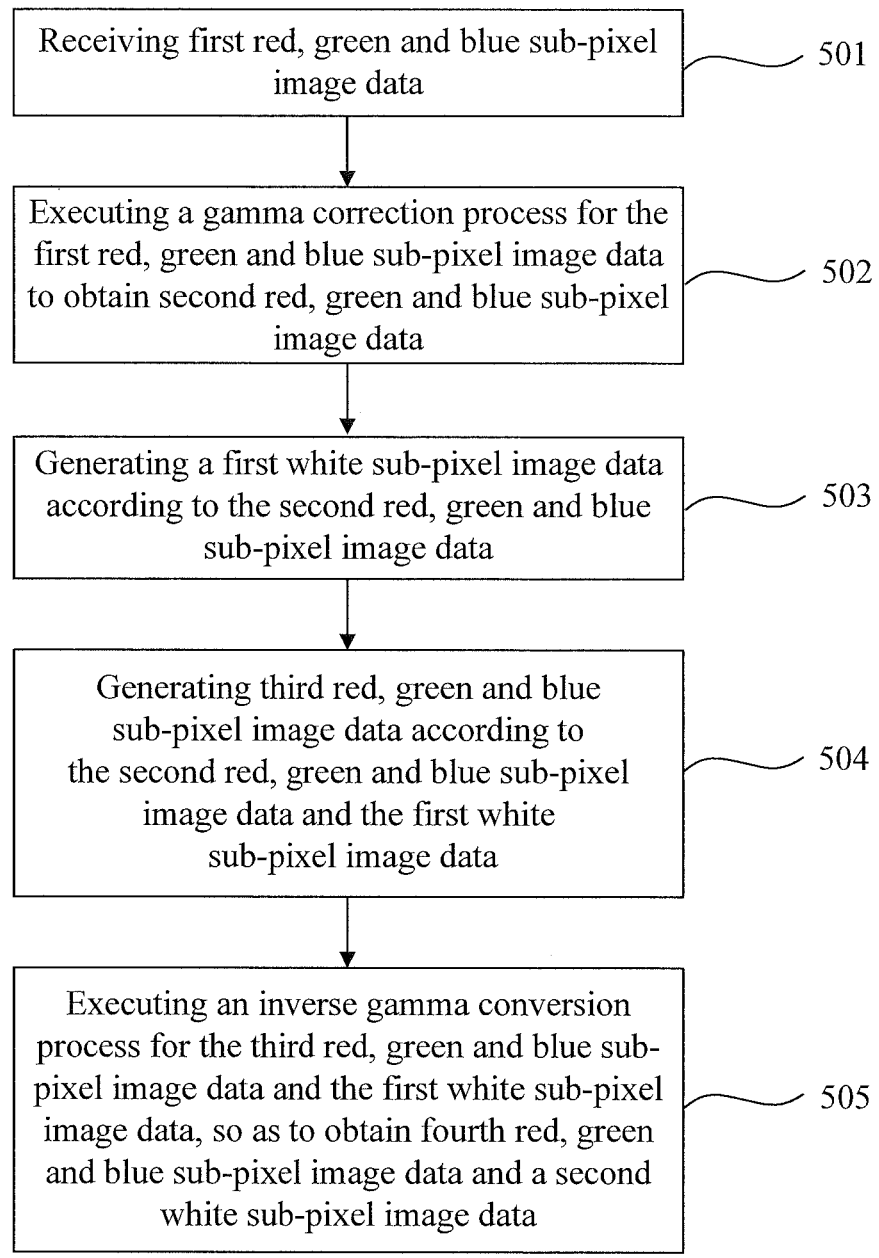
FIG. 5 is a flowchart of an image data processing method according to the first embodiment of the present invention.

Refer to FIG. 5, which is a flowchart of an image data processing method according to the first embodiment of the present invention. The image data processing method of the present invention is adapted for the above image data processing device.

The image data processing method of the present embodiment includes the following steps:

A (step 501), the receiving module 101 receives a first red sub-pixel image data, a first green sub-pixel image data, and a first blue sub-pixel image data.

B (step 502) the gamma correction processing module 102 executes a gamma correction process/normalization process for the first red sub-pixel image data, the first green sub-pixel image data, and the first blue sub-pixel image data to obtain a second red sub-pixel image data, a second green sub-pixel image data, and a second blue sub-pixel image data.

C (step 503) the first image data generating module 103 generates a first white sub-pixel image data according to the second red sub-pixel image data, the second green sub-pixel image data, and the second blue sub-pixel image data.

D (step 504) the second image data generating module 104 generates a third red sub-pixel image data, a third green sub-pixel image data, and a third blue sub-pixel image data according to the second red sub-pixel image data, the second green sub-pixel image data, the second blue sub-pixel image data, and the first white sub-pixel image data.

E (step 505) the inverse gamma conversion processing module 105 executes an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

The above technical solution is implemented to convert RGB image data to RGBW image data. Since the RGBW image data has the W (white) component, the display brightness of a display panel is thereby increased. In the present invention, the display panel saves more power when it displays an image with equivalent brightness, or the display panel achieves a higher brightness while consuming an equivalent electrical power.

The image data processing method of the second embodiment of the present invention is similar to the above first embodiment, and a difference is as follows:

The step C (namely, the step 503) comprises the following steps:

(c1) The color space conversion module 201 of the first image data generating module 103 is used to execute a color space conversion for the second red sub-pixel image data, the second green sub-pixel image data, and the second blue sub-pixel image data to obtain an angle data, a saturation data, and a brightness data, and wherein the angle data, the saturation data, and the brightness data are related to the color space. The color space mode corresponding to the color space (Munsell H(Hue), S(Saturation), and I(Intensity) model) is illustrated in FIG. 3. Accordingly, a hue angle coordinate corresponding to the color space is illustrated in FIG. 4.

(c2) The first calculating module 202 of the first image data generating module 103 is used to calculate the first white sub-pixel image date according to the saturation data and the brightness data. Specifically, the first calculating module 202 is used to analyze the brightness (intensity) and the saturation to obtain an analysis result, and calculate the first white sub-pixel image data according to the analysis result.

A value corresponding to the saturation=1−3/[(Ri+Gi+Bi)*min(Ri, Gi, Bi)], and the min(Ri, Gi, Bi) is equal to a minimum value of the Ri, the Gi, and the Bi.

The value corresponding to the first white sub-pixel image data=the value corresponding to the brightness data*(1−the value corresponding to the saturation data).

The step (D) (namely, the step 504) includes the following steps:

(d1) The second calculating module of the second image data generating module 104 is used to calculate a gain value according to the saturation data.

(d2) The second calculating module calculates a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

The step (d1) includes the following steps:

(d11) If the hue of the converted RGBW image data and the hue of the original RGB image data are unchanged, namely, (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data, namely, (Ro+Wo):(Go+Wo):(Bo+Wo)=Ri:Gi:Bi. The first calculating module 202 is further used to calculate the gain value according to the following formula:

The gain value=2−the value corresponding to the saturation data, and the maximum value of the value corresponding to the brightness data is less than or equal to a brightness threshold.

The gain value=f(1−S), wherein the maximum value of the value corresponding to the brightness data is greater than a preset brightness threshold.

The f(1−S) is a function which has a variable (1−S), the f(1−S) is used to restrain and smooth the gain so as to avoid overflow and smooth increment of the Ro, Go, and Bo, namely, avoiding the ratio (Ro+Wo):(Go+Wo):(Bo+Wo)=Ri:Gi:Bi being destroyed.

The step d2 comprises the following steps:

(d21) The second calculating module calculates the third red sub-pixel image data, the third green sub-pixel image data, and the third blue sub-pixel image data according to the following formula:

the value corresponding to the third red sub-pixel image data=the value corresponding to the second red sub-pixel image data*the gain value−the value corresponding to the first white sub-pixel image data;

the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

Through the above technical solution, each component of the outputted RGBW image data is kept smooth.

There are one or more implementations represented or described for the present invention, but those who skilled in the art may provide some equivalent variations and modifications based on the understanding of the specification and the figures. The present invention comprises all the equivalent variations and modifications and is only constrained by the claims. Especially regarding the various functions of the above described components, the terms describing the components mean corresponding to any element (unless specially defined) with a specified function (for example, with the equivalent function) of the implemented component, even if there is a different structure in comparison to the exemplary embodiments of the present specification. Furthermore, even though the specification discloses only an implementation of the specified feature, the specified feature can be combined with other characteristics if there are some advantages. In addition, the terms "including", "having", or other like terms used in detailed description or claims are similar to the meaning of the word "comprising."

In summary, the present invention has been described with preferred embodiments thereof, but the above described preferred embodiments are not intended to limit the present invention. Those who are skilled in the art can make many changes and modifications to the described embodiment which can be carried out without departing from the scope and the spirit of the invention that is intended to be limited only by the appended claims.

What is claimed is:

1. An image data processing method, comprising steps of:
   (A) receiving a first red sub-pixel image data, a first green sub-pixel image data, and a first blue sub-pixel image data;
   (B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data;
   (C) generating a first white sub-pixel image data according to the second red sub-pixel image data, the second green sub-pixel image data, and the second blue sub-pixel image data;
   (D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and
   (E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data;
   wherein the step (C) comprises steps of:
   (c1) executing a color space conversion for the second red sub-pixel image data, the second green sub-pixel image data and the second blue sub-pixel image data to obtain an angle data, a saturation data, and a brightness data, wherein the angle data, the saturation data, and the brightness data are related to the color space, a color space mode corresponding to the color space is a Munsell hue saturation brightness model; and
   (c2) calculating the first white sub-pixel image date according to the saturation data and the brightness data;

wherein the step (c2) comprises a step of:
   (c21) analyzing the brightness and the saturation to obtain an analysis result, and calculating the first white sub-pixel image data according to the analysis result;
   wherein a value corresponding to the saturation=1−3/[(Ri+Gi+Bi)*min(Ri, Gi, Bi)], the min(Ri, Gi, Bi) is equal to a minimum value of the Ri, the Gi, and the Bi;
   wherein the value corresponding to the first white sub-pixel image data=the value corresponding to the brightness data*(1−the value corresponding to the saturation data);
   wherein the value corresponding to the second red sub-pixel image data is Ri, the value corresponding to the second green sub-pixel image data is Gi, and the value corresponding to the second blue sub-pixel image data is Bi.

2. The image data processing method according to claim 1, wherein the step (D) comprises steps of:
   (d1) calculating a gain value according to the saturation data; and
   (d2) calculating a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

3. The image data processing method according to claim 2, wherein the step (d1) comprises a step of:
   (d11) calculating the gain value according to the following formula:
   the gain value=2−the value corresponding to the saturation data;
   wherein the maximum value of the value corresponding to the brightness data is less than or equal to a brightness threshold; and
   wherein (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

4. The image data processing method according to claim 2, wherein the step (d2) comprises a step of:
   (d21) calculating the third red sub-pixel image data, the third green sub-pixel image data, and the third blue sub-pixel image data according to the following formula:
   the value corresponding to the third red sub-pixel image data=the value corresponding to the second red sub-pixel image data*the gain value−the value corresponding to the first white sub-pixel image data;
   the value corresponding to the third green sub-pixel image data=the value corresponding to the second green sub-pixel image data*the gain value−the value corresponding to the first white sub-pixel image data; and
   the value corresponding to the third blue sub-pixel image data=the value corresponding to the second blue sub-pixel image data*the gain value−the value corresponding to the first white sub-pixel image data.

5. An image data processing method, comprising steps of:
(A) receiving a first red sub-pixel image data, a first green sub-pixel image data, and a first blue sub-pixel image data;
(B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data;
(C) generating a first white sub-pixel image data according to the second red sub-pixel image data, the second green sub-pixel image data, and the second blue sub-pixel image data;
(D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and
(E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

6. The image data processing method according to claim 5, wherein the step (C) comprises steps of:
(c1) executing a color space conversion for the second red sub-pixel image data, the second green sub-pixel image data and the second blue sub-pixel image data to obtain an angle data, a saturation data, and a brightness data, wherein the angle data, the saturation data, and the brightness data are related to the color space; and
(c2) calculating the first white sub-pixel image date according to the saturation data and the brightness data.

7. The image data processing method according to claim 6, wherein a color space mode corresponding to the color space is a Munsell hue saturation brightness model.

8. The image data processing method according to claim 6, wherein the step (c2) comprises a step of:
(c21) analyzing the brightness and the saturation to obtain an analysis result, and calculating the first white sub-pixel image data according to the analysis result;
wherein a value corresponding to the saturation=1−3/[(Ri+Gi+Bi)*min(Ri, Gi, Bi)], the min(Ri, Gi, Bi) is equal to a minimum value of the Ri, the Gi, and the Bi;
wherein the value corresponding to the first white sub-pixel image data=the value corresponding to the brightness data*(1−the value corresponding to the saturation data);
wherein the value corresponding to the second red sub-pixel image data is Ri, the value corresponding to the second green sub-pixel image data is Gi, and the value corresponding to the second blue sub-pixel image data is Bi.

9. The image data processing method according to claim 6, wherein the step (D) comprises steps of:
(d1) calculating a gain value according to the saturation data; and
(d2) calculating a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

10. The image data processing method according to claim 9, wherein the step (d1) comprises a step of:
(d11) calculating the gain value according to the following formula:
the gain value=2−the value corresponding to the saturation data;
wherein the maximum value of the value corresponding to the brightness data is less than or equal to a brightness threshold; and
wherein (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

11. The image data processing method according to claim 9, wherein the step (d1) comprises a step of:
(d12) calculating the gain value according to the following formula:
the gain value=f(1−S), wherein the maximum value of the value corresponding to the brightness data is greater than a preset brightness threshold; and
wherein the f(1−S) is a function which has a variable (1−S), the f(1−S) is used to avoid overflow and smooth increment of the Ro, Go, and Bo;
wherein the value corresponding to the third red sub-pixel image data is Ro, the value corresponding to the third green sub-pixel image data is Go, and the value corresponding to the third blue sub-pixel image data is Bo.

12. The image data processing method according to claim 9, wherein the step (d2) comprises a step of:
(d21) calculating the third red sub-pixel image data, the third green sub-pixel image data, and the third blue sub-pixel image data according to the following formula:
the value corresponding to the third red sub-pixel image data=the value corresponding to the second red sub-pixel image data*the gain value−the value corresponding to the first white sub-pixel image data;
the value corresponding to the third green sub-pixel image data=the value corresponding to the second green sub-pixel image data*the gain value−the value corresponding to the first white sub-pixel image data; and
the value corresponding to the third blue sub-pixel image data=the value corresponding to the second blue sub-pixel image data*the gain value−the value corresponding to the first white sub-pixel image data.

13. A image data processing device, comprising:
a receiving module receiving a first red sub-pixel image data, a first green sub-pixel image data, and a first blue sub-pixel image data;
a gamma correction processing module executing a gamma correction process for the first red sub-pixel image data, the first green sub-pixel image data, and the first blue sub-pixel image data to obtain a second red sub-pixel image data, a second green sub-pixel image data, and a second blue sub-pixel image data;
a first image data generating module generating a first white sub-pixel image data according to the second red sub-pixel image data, the second green sub-pixel image data, and the second blue sub-pixel image data;

a second image data generating module generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and an inverse gamma conversion processing module executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

14. The image data processing device according to claim 13, wherein the first image data generating module comprises:

a color space conversion module executing a color space conversion for the second red sub-pixel image data, the second green sub-pixel image data and the second blue sub-pixel image data to obtain an angle data, a saturation data and a brightness data, wherein the angle data, the saturation data, and the brightness data are related to the color space; and a first calculating module calculating the first white sub-pixel image date according to the saturation data and the brightness data.

15. The image data processing device according to claim 14, wherein a color space mode corresponding to the color space is a Munsell hue saturation brightness model.

16. The image data processing device according to claim 14, wherein the first calculating module analyzing the brightness and the saturation to obtain an analysis result, and calculating the first white sub-pixel image data according to the analysis result;

wherein a value corresponding to the saturation=1−3/[(Ri+Gi+Bi)*min(Ri, Gi, Bi)], and the min(Ri, Gi, Bi) is equal to a minimum value of the Ri, the Gi, and the Bi;

wherein the value corresponding to the first white sub-pixel image data=the value corresponding to the brightness data*(1−the value corresponding to the saturation data); and wherein the value corresponding to the second red sub-pixel image data is Ri, the value corresponding to the second green sub-pixel image data is Gi, and the value corresponding to the second blue sub-pixel image data is Bi.

17. The image data processing device according to claim 14, wherein the second image data generating module comprises:

a second calculating module calculating a gain value according to the saturation data and calculating a third red sub-pixel image data, a third green sub-pixel image data, and a third blue sub-pixel image data according to the second red sub-pixel image data, the second green sub-pixel image data, the second blue sub-pixel image data, the first white sub-pixel image data, and the gain value.

18. The image data processing device according to claim 17, wherein the first calculating module further calculates the gain value according to the following formula:

the gain value=2−the value corresponding to the saturation data;

wherein the maximum value of the value corresponding to the brightness data is less than or equal to a brightness threshold; and wherein (the value corresponding to the third red sub-pixel image data+the value corresponding to the first white sub-pixel image data):(the value corresponding to the third green sub-pixel image data+the value corresponding to the first white sub-pixel image data):(the value corresponding to the third blue sub-pixel image data+the value corresponding to the first white sub-pixel image data)=the value corresponding to the second red sub-pixel image data:the value corresponding to the second green sub-pixel image data:the value corresponding to the second blue sub-pixel image data.

19. The image data processing device according to claim 17, wherein the first calculating module further calculates the gain value according to the following formula:

the gain value=f(1−S), wherein the maximum value of the value corresponding to the brightness data is greater than a preset brightness threshold;

wherein the f(1−S) is a function which has a variable (1−S), the f(1−S) is used to avoid overflow and smooth increment of the Ro, Go, and Bo;

wherein the value corresponding to the third red sub-pixel image data is Ro, the value corresponding to the third green sub-pixel image data is Go, and the value corresponding to the third blue sub-pixel image data is Bo.

20. The image data processing device according to claim 17, wherein the second calculating module further calculates the third red sub-pixel image data, the third green sub-pixel image data, and the third blue sub-pixel image data according to the following formula:

the value corresponding to the third red sub-pixel image data=the value corresponding to the second red sub-pixel image data*the gain value−the value corresponding to the first white sub-pixel image data;

the value corresponding to the third green sub-pixel image data=the value corresponding to the second green sub-pixel image data*the gain value−the value corresponding to the first white sub-pixel image data; and the value corresponding to the third blue sub-pixel image data=the value corresponding to the second blue sub-pixel image data*the gain value−the value corresponding to the first white sub-pixel image data.

* * * * *